Aug. 28, 1934.     F. LANGE     1,971,688
ELECTRICAL COMPENSATOR
Filed Oct. 23, 1928     5 Sheets-Sheet 1

Aug. 28, 1934.    F. LANGE    1,971,688
ELECTRICAL COMPENSATOR
Filed Oct. 23, 1928    5 Sheets-Sheet 5

Fig. 5ª

Fig. 5ᵇ

Inventor
Fritz Lange
by King & Young
Attorneys

Patented Aug. 28, 1934

1,971,688

UNITED STATES PATENT OFFICE 1,971,688

ELECTRICAL COMPENSATOR

Fritz Lange, Kiel, Germany, assignor to Electroacustic Gesellschaft mit beschränkter Haftung, Kiel, Germany, a firm Application October 23, 1928, Serial No. 314,390
In Germany October 27, 1927

2 Claims. (Cl. 177—386)

The invention has for its object a so-called compensator, that is to say, an apparatus as is used, for example, in the subaqueous sound art, in order to synchronize the impulses of different receivers or transmitters or to bring them into any particular time or phase relationship to one another. In electrically acting or electrically operated transmitters or receivers it is well-known to use for this purpose so-called artificial electrical lines or retardation lines, that is to say, combinations of conductors with inductance and capacity, which are traversed by electrical impulses or alternating currents, so that the latter experience particular time lags. In this case, the artificial line connected between transmitter and source of current or between receiver and telephone must be variable. Therefore such lines are preferably formed of conducting circuits, each of which imparts to the wave or the impulse a certain amount of time lag. By inserting more or fewer of such conducting circuits or sections, the amount of time lag can be varied and adjusted.

In such compensators, hitherto a special artificial line has always been arranged for each transmitter or receiver. The present invention as an improvement, provides only one line chain for all transmitters or receivers, which line is connected with switching members in such a way that different groups of sections of this one line can be connected in a regular manner between the transmitter or receiver on the one hand and the source of current or the telephone on the other. The invention depends upon the discovery that it is possible to allow the currents of different transmitters or receivers to traverse the same artificial line or the same parts of a line, without confusing the ordered combination of the waves or impulses in the field or in the telephone. The advantages of the invention over the prior art devices reside mainly in a simplification of the connections and in the unification or decrease in the number of artificial lines.

Figure 1:
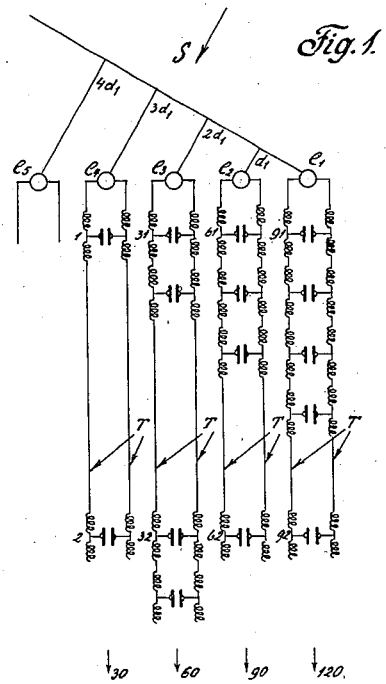
Figure 2:
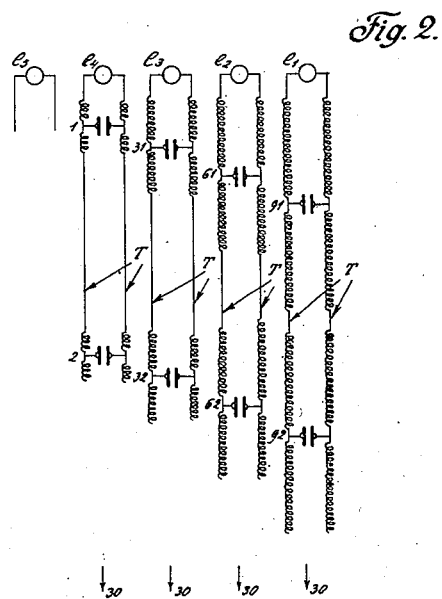

In the accompanying drawings, Figs. 1 to 5 may serve for explaining the invention, and represent in:

Figs. 1 and 2 the two possible cases of the form of compensators with separate artificial lines diagrammatically illustrated.

Figure 3:
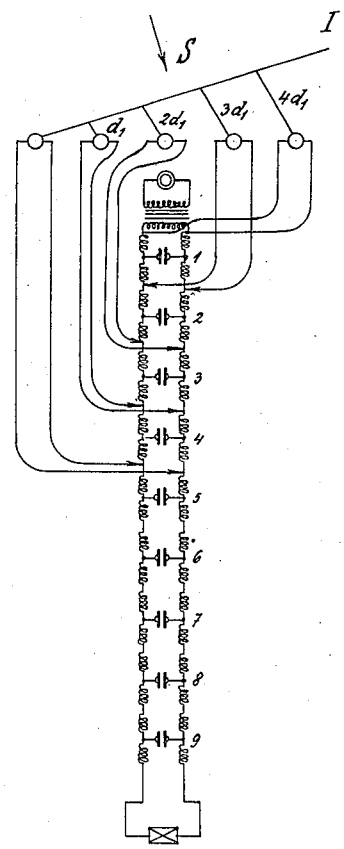
Figure 3:
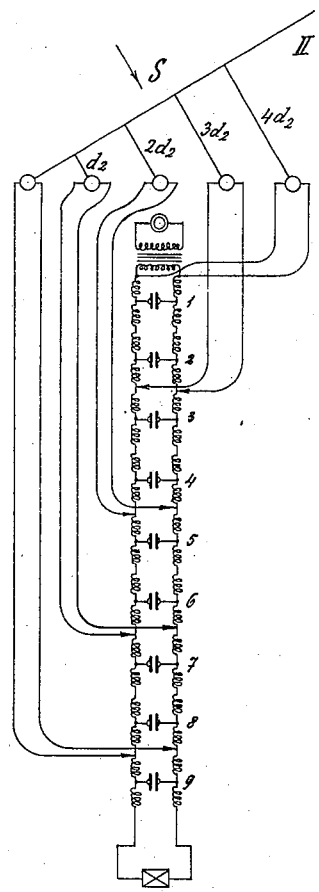

Fig. 3 the circuit diagram of a compensator according to the invention.

Figure 4:
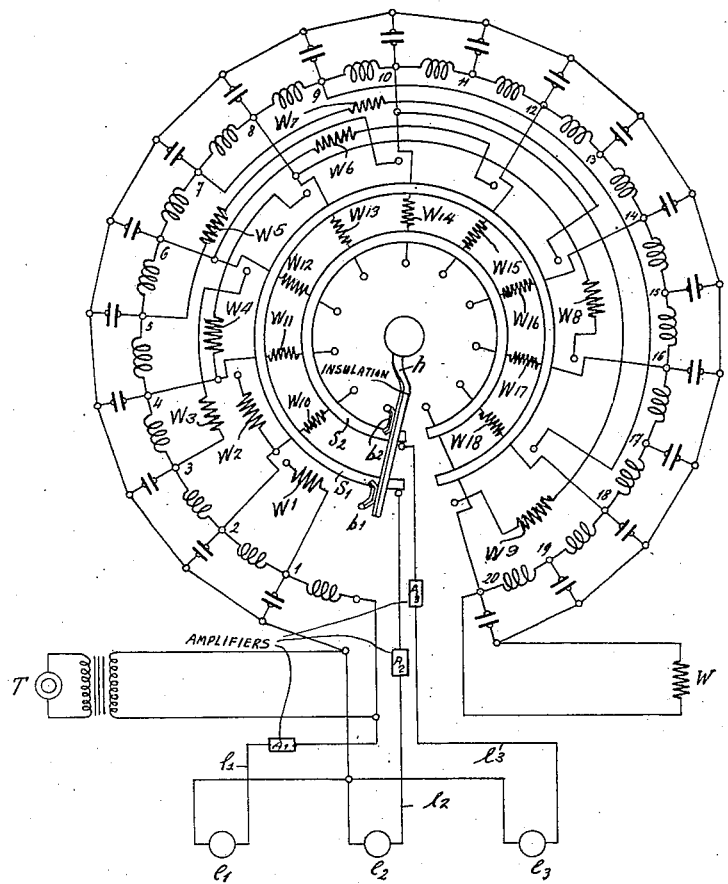

Fig. 4 the partly diagrammatic form of a rotary compensator according to the invention for three transmitters or receivers arranged in a straight line in the field.

Figure 5:
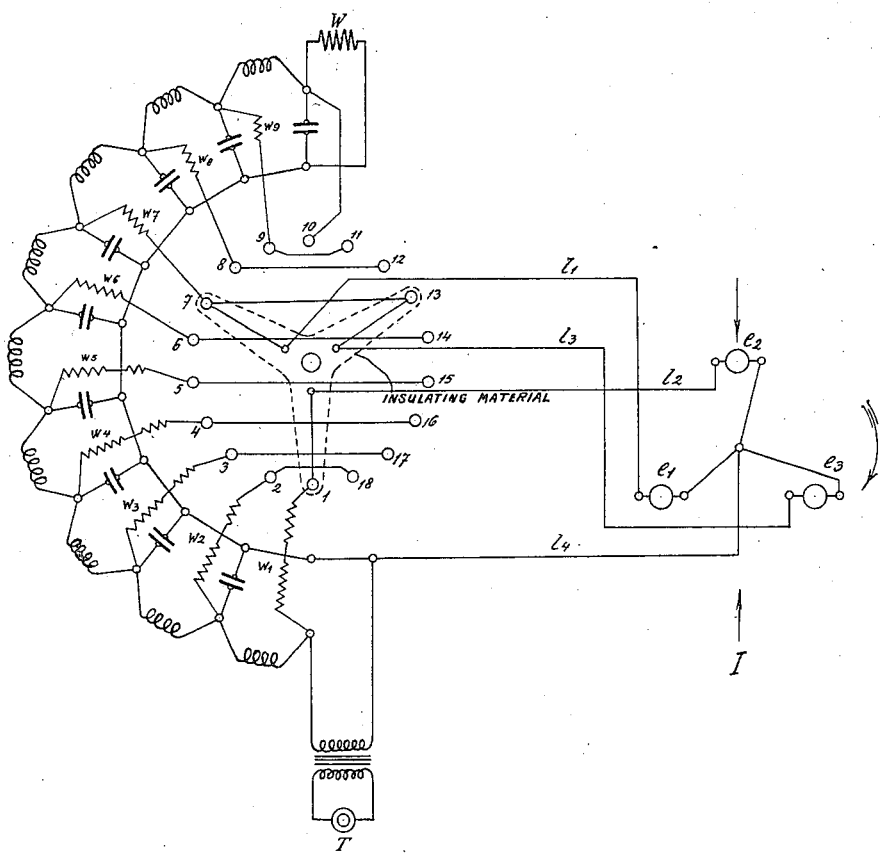
Figure 6:
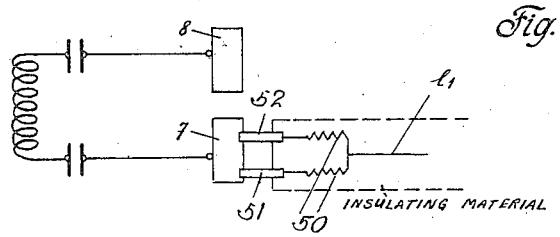
Figure 6:
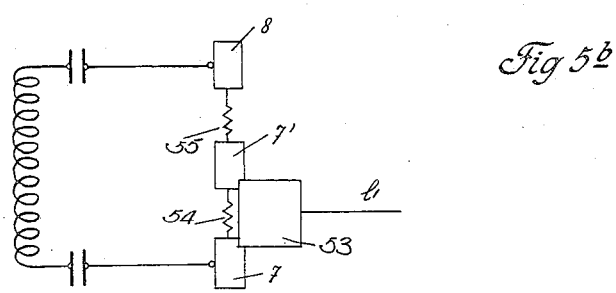
Figure 6:
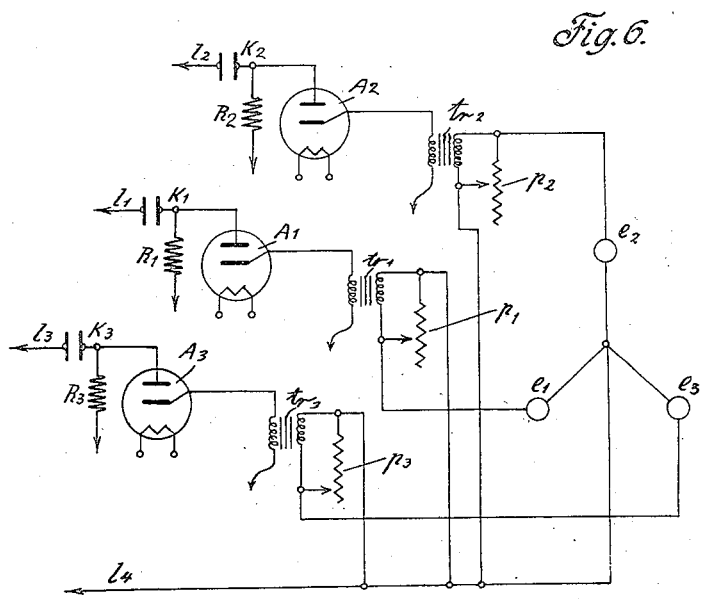

Figs. 5, 5a and 5b, the partly diagrammatic form of a rotary compensator according to the invention for three transmitters or receivers arranged on a circle in the field, and in Fig. 6, the details of an advantageous method of connecting the receivers to the artificial lines.

Figs. 1 and 2 are merely to be used in comparison with Fig. 3 for proving that with regard to number or equality of the artificial lines advantages are obtained by the invention.

In the cases of Figs. 1 to 3 it is assumed throughout that there are five sound receivers $e_1$, $e_2$, $e_3$, $e_4$, $e_5$ arranged in a straight horizontal line in the field, which are used for determining the direction of a sound arriving from any direction. In this case, as is well known, the waves of displaced phase of a laterally arriving sound beam S are brought into phase in the telephone receiver T after they have been converted into electrical oscillations in the receivers, and in this manner they produce a maximum of tone intensity in the telephone receiver. For this purpose it is necessary that the time displacements at the entry of the sound beam into the receivers $e_1$ to $e_5$ which, for example, in Fig. 1 may amount respectively to the values 0, $d_1$, $2d_1$, $3d_1$, $4d_1$, are compensated by inserting corresponding artificial lines. Now assuming the angle of 90 degrees, in which the sound beam can rotate (for the other 90 the same compensator can be used with reversal of the artificial lines on the receivers), the compensator is to be traversed in 30 steps. Such a compensator must then contain in the first artificial line 30 sections, in the second 60, in the third 90 and in the fourth 120 sections, if all the sections are to be the same, thus totalling 300 sections. In this case, at each step, in the first line 1 section is inserted, in the second 2 sections, in the third 3, and in the fourth 4 sections. There is also a possibility of connecting only 1 section in each line at each step, if the lag value of the line sections is chosen differently, that is to say, in the present case, increasing with every ordinal number of the line by 1 unit of lag. In the case of the present example it is then sufficient to use $4 \times n$ artificial lines, where $n$ is the number of steps, but it is necessary to make as many different kinds of sections as there are lines, thus for $m$ receivers $m-1$ kinds. These two possibilities are illustrated in Figs. 1 and 2. In the case of Fig. 1 $n(1+2+3 \ldots (m-1))$ equal line sections are necessary, in the case of Fig. 2 however $n(m-1)$ of $m-1$ different kinds.

A compensator according to the invention, whose diagrammatical circuit is shown in Fig. 3 is free from this disadvantage. In this circuit and arrangement $n(m-1)$ line sections also are sufficient, which however can all be equal, as always only the next smaller group is also traversed by all the currents of the higher ordinal number.

The circuit arrangement of such a compensator is characterized by the feature that the telephone is connected firmly to one end of the single artificial line of $n(m-1)$ equal sections of the smallest time lag value (unit value), at the other end of which line a resistance of the same characteristic as the line itself is connected for avoiding reflections at the end of the line. The connections between the line sections and the receiver in contradistinction to the telephone connection, are variable so that at the time of switching the connection of the receiver passes over the ordinal number $x$ by 1 line section more than the connection of the receiver of the ordinal number $x-1$. In Figs. 3a and 3b, two cases are shown, the first one in which the wave front of the sound beam S enters in the position I, whilst in the second case it enters in the position II, in which case it is assumed that the time lag values $d_1$ and $d_2$ in both cases obey the equation $d_2=2d_1$. In that case, $d_1$ may be equal to the time lag value of a line section. It will be seen immediately that in case of Fig. 3ª the currents of the receivers $e_1$ to $e_5$ must traverse 0, 1, 2, 3 and 4 line sections, whilst in the second case (Fig. 3b) they traverse 0, 2, 4, 6 and 8 line sections.

Fig. 4 shows a mechanical constructional example of a rotary compensator according to the invention for a receiving group of 3 receivers arranged in a straight line. Here again the telephone T is connected to one end of the artificial line and the resistance W to the other. The receiver $e_1$ is connected directly parallel to the telephone at the same end of the line. One pole of each of the receivers $e_2$ and $e_3$ is likewise joined directly with the telephone at the same end of the artificial line, whilst their other pole is connected respectively to slip rings $s_1$ and $s_2$. The ends of the individual line sections are taken to two circles of contacts, one circle being allotted to each of the slip rings $s_1$, $s_2$, the contacts of the outer circle being connected successively with successive line sections, while the contacts of the inner circle are successively connected to alternate line sections. On the slip rings and contact circles run two sliding bridges $b_1$ and $b_2$, which are fixed on the rotatable contact arm $k$ of insulating material. On rotating this arm from step to step, one line section is added to the circuit of receiver $e_2$, and two sections are added to the circuit of receiver $e_3$. According to this principle, compensators for any desired number of line sections can be constructed. For $m$ receivers $m-1$ slip rings and contact bridges are necessary and for $n$ steps $n(m-1)$ contacts.

In the example of Fig. 5 is shown a rotary compensator of the simplest kind according to the invention for 3 receivers arranged in the corners of an equilateral triangle. Here also the telephone T is connected to the beginning, the resistance W to the end of the filter. One pole of each receiver is likewise connected to the beginning of the artificial line. The other poles of the receivers are taken to three contact arms of insulating material displaced by 120°, which run over a circle of contacts divided into two semicircles, the corresponding contacts of the two semicircles being electrically connected. The illustrated position is the setting for receiving wave I. The receivers $e_1$ and $e_3$ are struck first and simultaneously, the receiver $e_2$ last. The latter therefore need not have any line section connected, whilst $e_1$, $e_3$ must have equal artificial line lengths in their line to the telephone. The contact arm carrying the lead for $e_2$ is connected therefore to contact 1, the contact arms carrying the leads for $e_1$ and $e_2$ on the other hand are connected respectively to the line contacts 7 and 13 connected with one another, and with the same line length. A rotation of the contact arms must correspond in the same sense to a turn of the sound wave front in the direction of the feathered arrow, since in this case in front of $c_1$, a greater time lag must be inserted, in front of $c_3$ a smaller time lag. Since a non-uniformity of signal strength is caused by some receivers being loaded with line sections more than others perhaps some of the receivers not being loaded at all, I provide compensating resistances in the leads to the several sections of such value that uniformity is established in all receivers. In Fig 5 these resistances are indicated with $w_1-w_9$, and in Fig. 4 with $w_1-w_{18}$. Their values progressively increase with the amount of artificial line removed, so that the removed part of the line is always compensated by the resistance thrown in circuit. By this expedient the amount of energy transmitted to the telephone—in case of receiving—always remains constant. Vice versa in case of energy transmission, the amount of sound energy radiated by the oscillator connected remains independent of the position of the sliding contact on the compensator.

On connecting the line sections care must be taken that the sliding contact of the connecting arm has already reached the next counter-contact, before it leaves the preceding one. In this case, a position necessarily arises, in which the sliding contact would short-circuit the line section to be directly connected in circuit, so that for this moment a reverse rotation of the vector of all the connected oscillators (transmitters or receivers) would occur, and the more oscillator connected to the line, the stronger it would be In order to prevent that, according to the invention, a resistance is inserted between receiver and the line, which resistance appropriately has the value of about three to six time the resistance of a line section and which remains connected on the passage of the sliding contact from contact stud to contact stud. Such a type of construction is shown in Fig. 5a. The contact studs 7 and 8 (see Fig. 5) are brushed by a split sliding contact, whose contact elements 51, 5 are connected by a resistance 50 of suitable value as aforementioned, the middle of this resistance being in turn connected to lead $l_1$, leading in this particular case to receiver $e_1$, so that the two halves of this resistance always remain connected in circuit in parallel when the sliding contacts are both on the same fixed line contact whereas when contact half 51 is on contact and 52 on contact 8, the two line contacts 7 an 8 are temporarily connected by the entire resistance 50.

Another solution is shown by Fig. 5b, in which an integral contact block 53 connected to lead wipes over an intermediate fixed contact 7' an the resistance between the adjacent fixed line contacts 7 and 8 is divided into two halves 54, 5 which are inserted between fixed contacts 7, 7 and 7', 8 respectively.

This last-named modification of the resistanc arrangement is shown in Fig. 4, where howeve only the reference characters pertaining to th filter sections 7 and 8 are applied, in order not to crowd the drawing.

In this method of connecting the receiver to the artificial line, it is to be noticed further that for each receiver the connection of every additional receiver signifies a point of reflection. The harmful effect of such points of reflection can be diminished by inserting into the individual branches of the receiver a high resistance. To increase the receiver resistance itself is for many reasons not always suitable, still less the insertion of loading resistance. More preferable is the solution shown in Fig. 6, which naturally is useful chiefly for receivers and in which the receivers are connected to the filters through amplifiers. Amplifiers in such receiving installations, besides, are necessary, so that by their use, considerable complication does not arise. These amplifying devices are indicated in Fig. 4 by the three rectangles $A_1$, $A_2$, $A_3$ in the respective leads $l_1$, $l_2$, $l_3$ of the receivers and are more particularly illustrated in Fig. 6. $e_1$, $e_2$, $e_3$ again indicate three receivers in star connection (Fig. 5). The conductors $l_1$ to $l_4$ correspond to the conductors $l_1$ to $l_4$ in Fig. 5 and lead to the artificial line. Condensers $k_1$ to $k_3$ are connected in series respectively into leads $l_1$ to $l_3$ and the plate battery connections required for the interposed respective tube amplifiers $A_1$, $A_2$, $A_3$ are branched off through large resistances $R_1$ to $R_3$ in front of the condensers. The receivers $l_1$—$l_3$ are connected to their respective amplifier $A_1$—$A_3$ through a transformer $tr_1$—$tr_3$ each of which has a variable resistance connected in parallel to its primary as denoted by $p_1$—$p_3$ respectively. These resistances serve for equalizing the amplitude.

In all the constructional examples a generator can be substituted for the telephone and respectively a transmitter for the receiver.

Generally speaking with respect to the scope of the elements $e_1$, $e_2$, $e_3$ conveniently termed "receivers" in the foregoing description, they may constitute any well known means for interchanging electrical energy and compressional wave energy, which definition, as used in some of the claims, would apply to both sending and receiving of wave energy. Likewise, for the telephone, shown for convenience, any other well known and suitable electromechanical impulse translating means may obviously be employed, the choice of the particular means used depending upon the particular purpose and character of the energy translation, for instance whether receiving or transmitting. The term "electromechanical impulse translating means" as used in the claims is intended to express the scope of this particular element of my novel combination.

Compensators according to the invention can be constructed considerably easier, more cheaply and more readily attended to than arrangements according to Figs. 1 and 2, since the number of electrical filters and mechanical contact paths is materially reduced. At the same time also the number of soldered joints is greatly reduced.

I claim:—

1. An electrical compensator comprising a single artificial line divided into sections of suitable relative values, an electromechanical impulse translating means at one end of said artificial line, a plurality of means for interchange of electrical energy and compressional wave energy and means for connecting the ends of different numbers of said sections to said means for interchange of electrical energy and compressional wave energy in different steps depending upon the relative positions of the said means for exchange of electrical energy to the wave front and compressional wave energy, whereby different portions of a single artificial line perform the functions of a plurality of artificial lines.

2. An installation for directional reception of sound, comprising in combination a number of means for interchange of electrical energy and sound energy arranged in definite position in the sound field, an electrical compensator connected to said interchange means and an electromechanical impulse translating means for perceiving the received sound, said compensator comprising a single artificial line divided into a plurality of sections and having said translating means connected to one of its ends and a resistance to its other end, contact elements respectively connected to said sections, a movable contact mechanism having separate branch connections with and contacts for said interchange means, and cooperating with said section contact elements for connecting different numbers of said sections to said interchange means in different steps depending upon the different relative positions of said interchange means in the sound field, and three-electrode amplifier tubes connected between said interchange means and the artificial line.

FRITZ LANGE.